United States Patent
Wernersson et al.

(10) Patent No.: US 12,300,897 B2
(45) Date of Patent: May 13, 2025

(54) ANTENNA ARRANGEMENT HAVING UNEQUALLY MANY PHYSICAL ANTENNA ELEMENTS FOR TRANSMISSION AND RECEPTION

(71) Applicant: Telefonaktiebolaget LM Ericsson (PUBL), Stockholm (SE)

(72) Inventors: Niklas Wernersson, Kungsängen (SE); Bo Göransson, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 17/792,436

(22) PCT Filed: Feb. 11, 2020

(86) PCT No.: PCT/SE2020/050137
§ 371 (c)(1),
(2) Date: Jul. 13, 2022

(87) PCT Pub. No.: WO2021/162592
PCT Pub. Date: Aug. 19, 2021

(65) Prior Publication Data
US 2023/0028888 A1    Jan. 26, 2023

(51) Int. Cl.
*H01Q 21/24*    (2006.01)
*H01Q 1/24*    (2006.01)
(Continued)

(52) U.S. Cl.
CPC .............. *H01Q 21/24* (2013.01); *H01Q 1/246* (2013.01); *H01Q 21/062* (2013.01); *H01Q 21/28* (2013.01)

(58) Field of Classification Search
CPC ...... H01Q 21/24; H01Q 1/246; H01Q 21/062; H01Q 21/28
See application file for complete search history.

(56) References Cited

U.S. PATENT DOCUMENTS 9,869,762 B1    1/2018 Alland et al.
2014/0219377 A1*    8/2014 Guey .................... H04L 5/0048
375/267

FOREIGN PATENT DOCUMENTS

EP    2 741 369 A1    6/2014
EP    3 079 266 A1    10/2016
(Continued)

OTHER PUBLICATIONS

European Search Report issued for Application No./Patent No. 20918463.9-1205 / 4104245—Nov. 23, 2022.
(Continued)

*Primary Examiner* — Graham P Smith
(74) *Attorney, Agent, or Firm* — Baker Botts L.L.P.

(57) ABSTRACT

There is provided an antenna arrangement having unequally many physical antenna elements for transmission and reception. The antenna arrangement comprises physical antenna elements. All physical antenna elements are configured for signal reception but less than all of the physical antenna elements are configured for both signal transmission and signal reception. A first portion of those physical antenna elements configured for both signal transmission and signal reception and a second portion of those physical antenna elements configured for both signal transmission and signal reception are in the antenna arrangement placed to, during operation of the antenna arrangement, be vertically separated by physical antenna elements configured for only signal reception.

20 Claims, 4 Drawing Sheets

(51) Int. Cl.
   *H01Q 21/06*   (2006.01)
   *H01Q 21/28*   (2006.01)

(56) References Cited

FOREIGN PATENT DOCUMENTS

| | | |
|---|---|---|
| EP | 3 116 258 A1 | 1/2017 |
| EP | 3 300 173 A2 | 3/2018 |
| EP | 3 503 298 A1 | 6/2019 |
| WO | 2008 020178 A1 | 2/2008 |
| WO | 2017 141232 A1 | 8/2017 |

OTHER PUBLICATIONS

PCT International Search Report issued for International application No. PCT/SE2020/050137—Nov. 3, 2020.
PCT Written Opinion of The International Searching Authority issued for International application No. PCT/SE2020/050137—Nov. 3, 2020.

* cited by examiner

S100

| S102 |
| --- |
| Communicate signal whilst applying beamforming, or precoder, weights at physical antenna elements |

ANTENNA ARRANGEMENT HAVING UNEQUALLY MANY PHYSICAL ANTENNA ELEMENTS FOR TRANSMISSION AND RECEPTION

PRIORITY

This nonprovisional application is a U.S. National Stage Filing under 35 U.S.C. § 371 of International Patent Application Serial No. PCT/SE2020/050137 filed and entitled "Antenna Arrangement Having Unequally Many Physical Antenna Elements For Transmission And Reception" which is hereby incorporated by reference in their entirety.

TECHNICAL FIELD

Embodiments presented herein relate to an antenna arrangement having unequally many physical antenna elements for transmission and reception. Embodiments presented herein further relate to a radio access network node, a method a computer program, and a computer program product for communicating signals using such an antenna arrangement.

BACKGROUND

In communications networks, there may be a challenge to obtain good performance and capacity for a given communications protocol, its parameters and the physical environment in which the communications network is deployed.

For example, currently used antenna systems, configured for operation using multiple frequencies as well as for multiple standards on the same site, puts demands on the ability to create effective antenna system. One part of the antenna system is the antenna unit and its antenna arrangement.

As an example, two-dimensional antenna arrangements could be configured such that each individual physical antenna element has independent phase and amplitude control, thereby enabling beamforming in both in the vertical and the horizontal dimension. Antenna arrays of such antenna arrangements might be described by the number of antenna columns corresponding to the horizontal dimension $M_h$, the number of antenna rows corresponding to the vertical dimension $M_v$ and the number of dimensions corresponding to different polarizations $M_p$. The total number of physical antenna elements in such an antenna arrangement is thus $M=M_h \cdot M_v \cdot M_p$. A special subset of antenna arrangements with two-dimensional (2D) antenna arrays are antenna arrangements with one-dimensional (1D) antenna arrays defined by the set of antenna arrays where $M_h=1$ and $M_v>1$ or where $M_h>1$ and $M_v=1$. The physical antenna elements might support different combinations of vertical, horizontal, and circular polarization. However, one common layout consists of cross-polarized (or dual polarized) physical antenna elements.

Antenna systems are built to support complex and powerful schemes for multiple input multiple output (MIMO) operations which implies support of an increasingly large amount of transmitter (TX) radio chains and receiver (RX) radio chains. A large amount of TX radio chains and RX radio chains does however imply certain challenges from a hardware perspective since the design of the antenna system, such as the antenna arrangement, more challenging. Examples of these hardware related challenges may for instance be related to cooling, size, weight and price of the antenna system.

Hence, there is still a need for improved antenna arrangements, especially for efficiently supporting MIMO operation.

SUMMARY

An object of embodiments herein is to provide an antenna arrangement meeting the above challenges and not suffering from the issues noted above, or at least where the above issues are mitigated or reduced.

A particular object of embodiments herein is to provide an antenna arrangement yielding high performance and being suitable for MIMO operation whilst still having a compact size.

According to a first aspect there is presented an antenna arrangement having unequally many physical antenna elements for transmission and reception. The antenna arrangement comprises physical antenna elements. All physical antenna elements are configured for signal reception but less than all of the physical antenna elements are configured for both signal transmission and signal reception. A first portion of those physical antenna elements configured for both signal transmission and signal reception and a second portion of those physical antenna elements configured for both signal transmission and signal reception are in the antenna arrangement placed to, during operation of the antenna arrangement, be vertically separated by physical antenna elements configured for only signal reception.

According to a second aspect there is presented a radio access network node comprising an antenna arrangement according to the first aspect.

According to a third aspect there is presented a method for signal communication using an antenna arrangement according to the first aspect. The method comprises communicating a signal whilst applying beamforming, or precoder, weights at the physical antenna elements. In some aspects, the method is performed by a radio access network node, such as the radio access network node of the second aspect According to a fourth aspect there is presented a computer program for signal communication using an antenna arrangement according to the first aspect, the computer program comprising computer program code which, when run on a radio access network node of the second aspect, causes the radio access network node to perform a method according to the third aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, the disclosed antenna arrangement meets the above challenges.

Advantageously, the disclosed antenna arrangement does not suffer from the issues noted above.

Advantageously, the disclosed antenna arrangement enable the use of fewer TX radio chains than RX radio chains. This is particularly advantageous since TX radio chains commonly are more complex, require more power, are larger in size, and more expensive than RX radio chains.

Advantageously, the disclosed antenna arrangement yields high performance and is suitable for MIMO operation whilst still having a compact size.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figures 1, 6:
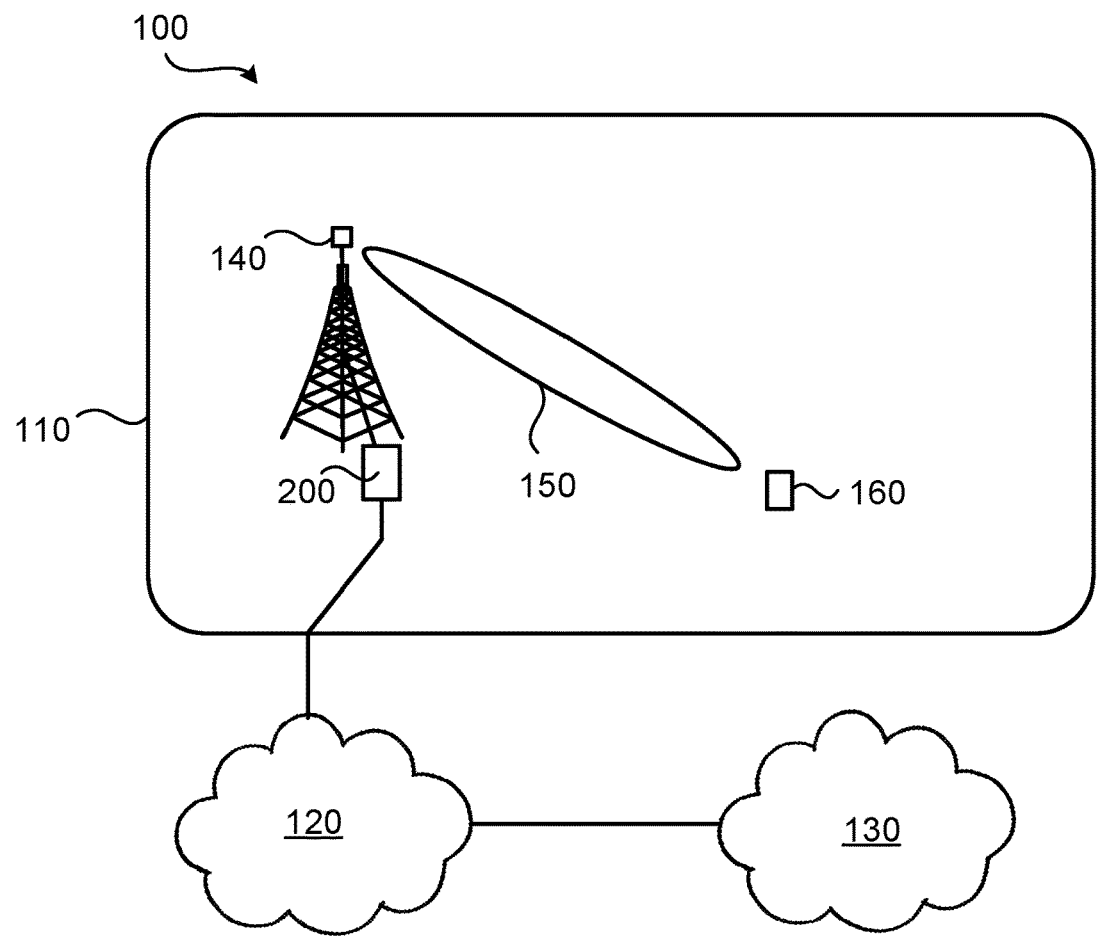
FIG. 1 is a schematic diagram illustrating a communication network according to embodiments.
FIG. 6 is a flowchart of methods according to embodiments.

FIG. 1 is a schematic diagram illustrating a communication network 100 where embodiments presented herein can be applied. The communication network 100 could be a third generation (3G) telecommunications network, a fourth generation (4G) telecommunications network, or a fifth (5G) telecommunications network and support any 3GPP telecommunications standard, where applicable.

The communication network 100 comprises a radio access network node 200 configured to provide network access to terminal devices 160 in a radio access network 110. The radio access network 110 is operatively connected to a core network 120. The core network 120 is in turn operatively connected to a service network 130, such as the Internet. The terminal devices 160 are thereby enabled to, via the radio access network node 200, access services of, and exchange data with, the service network 130.

The radio access network node 200 comprises, is collocated with, is integrated with, or is in operational communications with, an antenna arrangement 140. The radio access network node 200 (via its antenna arrangement 140) and the terminal devices 160 are configured to communicate with each other in beams iso.

Examples of radio access network nodes 200 are radio base stations, base transceiver stations, Node Bs, evolved Node Bs, g NBs, access points, access nodes, and backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

Figure 2:
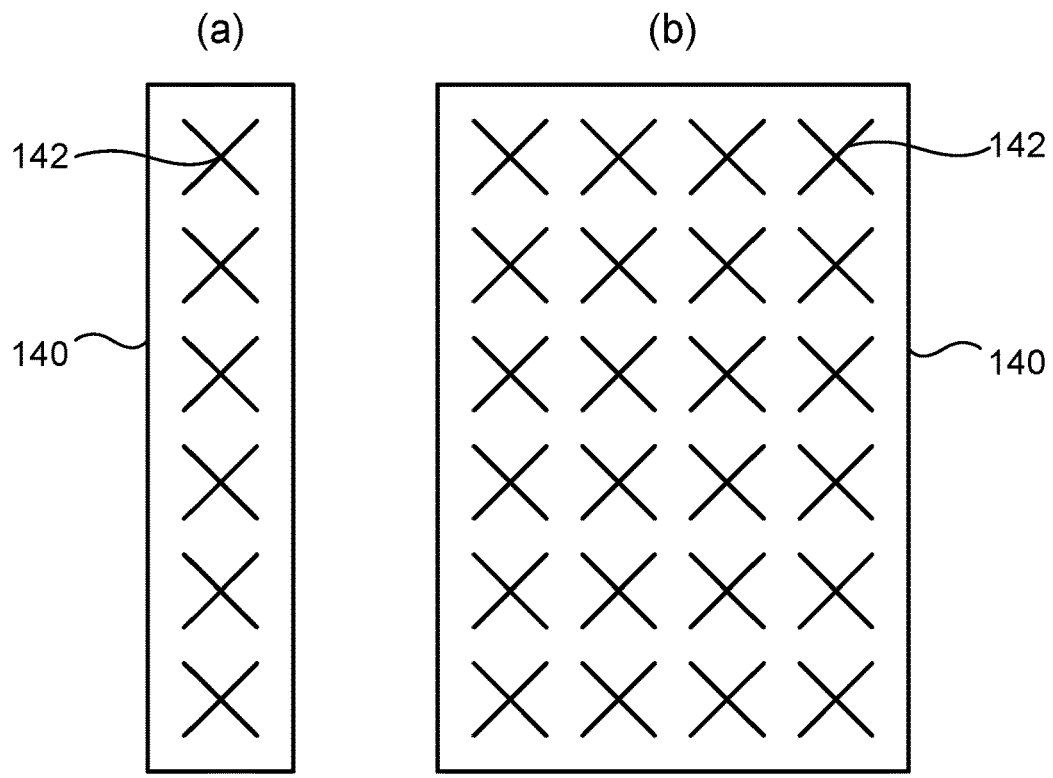
FIGS. 2, 3, 4, and 5 schematically illustrate antenna arrangements according to embodiments.

In general terms, the antenna arrangement 140 comprises physical antenna elements. FIG. 2 schematically illustrates two examples of antenna arrangements 140. Each antenna arrangement 140 comprises physical antenna elements, where one such physical antenna element is illustrated at reference numeral 142. The antenna arrangement 140 of FIG. 2(a) has six such physical antenna elements whereas the antenna arrangement 140 of FIG. 2(b) has 24 such physical antenna elements. In FIG. 2(a) is illustrated an example of an antenna arrangement 140 where the physical antenna elements 142 are arranged in a 1D antenna array (where the physical antenna elements 142 extend in the vertical direction). In FIG. 2(b) is illustrated an example of an antenna arrangement 140 where the physical antenna elements 142 are arranged in a 2D antenna array (where the physical antenna elements 142 extend in both the vertical direction and the horizontal direction).

Figure 3:
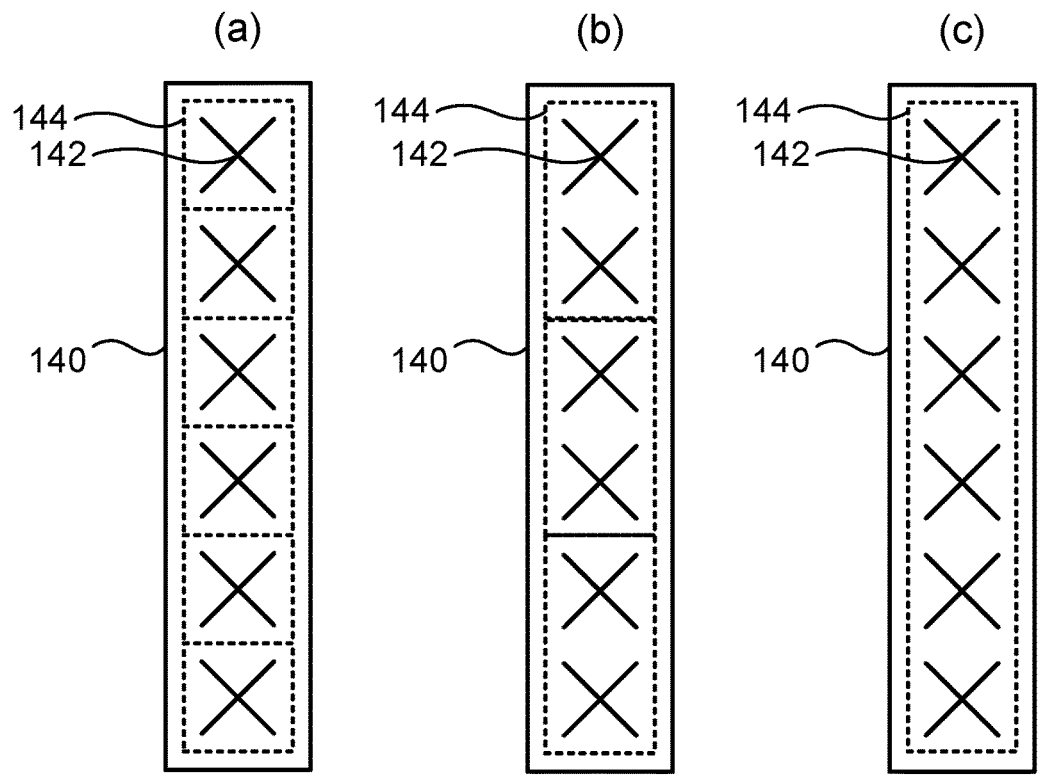

In general terms, the antenna arrangement 140 might be divided into one or more subarrays. FIG. 3 schematically illustrates three examples of antenna arrangements 140 where the physical antenna elements 142 are divided into subarrays 144. In FIG. 3(a) is illustrated an example of an antenna arrangement 140 where the physical antenna elements 142 are divided into as many subarrays 144 as there are physical antenna elements 142 (thus where there are six physical antenna elements 142 and six subarrays). In FIG. 3(b) is illustrated an example of an antenna arrangement 140 where the physical antenna elements 142 are divided into three subarrays 144 (thus where there are six physical antenna elements 142 and three subarrays). In FIG. 3(c) is illustrated an example of an antenna arrangement 140 where all the physical antenna elements 142 are part of one and the same subarray 144 (thus where there are six physical antenna elements 142 and one subarray).

As disclosed above there is still a need for improved antenna arrangements 140.

Further in this respect, to simplify the hardware design of the antenna arrangements 140 (for instance reduce cooling requirements, size, weight, cost, etc.) antenna arrangements 140 are proposed where all physical antenna elements are utilized for receiving purposes but only a proper subset thereof for transmitting purposes. This will consequently enable the use of fewer TX radio chains than RX radio chains. This could be advantageous since TX radio chains commonly are more complex, require more power, are larger in size, and more expensive than RX radio chains.

Furthermore, using an antenna arrangement 140 for an interference limited rural/suburban-like deployment will typically imply that the system interference level is the limiting performance factor at high system load. To reduce the system level interference, the design of the antenna arrangement 140 might therefore be matched to this kind of scenario.

The embodiments disclosed herein relate to an antenna arrangement 140 having unequally many physical antenna elements 142 for transmission and reception, a radio access network node 200 comprising such an antenna arrangement 140, and a method of communicating signals using such an antenna arrangement 140.

Figure 4:
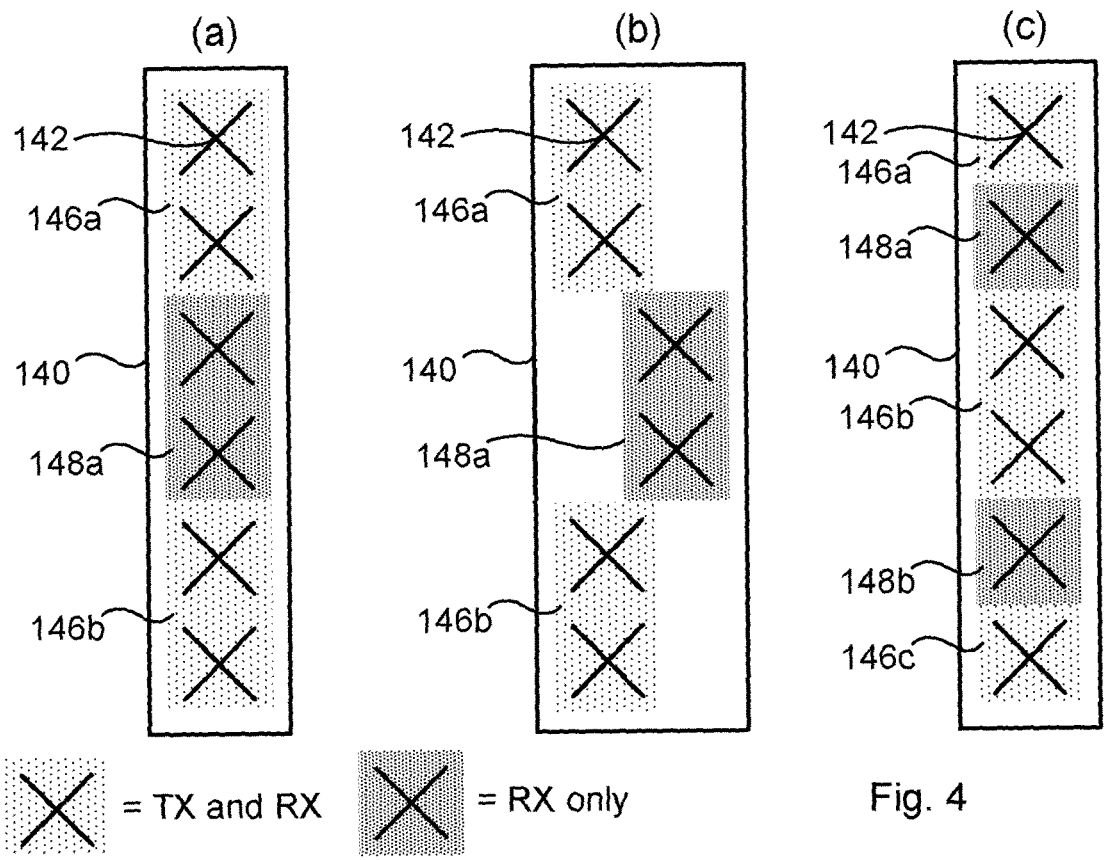

Reference is made to FIG. 4(*a*) that schematically illustrates an antenna arrangement 140 according to an embodiment. The antenna arrangement 140 comprises physical antenna elements 142. As illustrated, the antenna arrangement 140 has unequally many physical antenna elements 142 for transmission and reception. In particular, all physical antenna elements 142 are configured for signal reception but less than all of the physical antenna elements 142 are configured for both signal transmission and signal reception. In this respect, a first portion 146*a* of those physical antenna elements 142 configured for both signal transmission and signal reception and a second portion 146*b* of those physical antenna elements 142 configured for both signal transmission and signal reception are in the antenna arrangement 140 placed to, during operation of the antenna arrangement 140, be vertically separated by physical antenna elements 142 configured for only signal reception.

Such an antenna arrangement 140 is optimized, in terms of a design targeted to reduce cooling requirements, size, weight, cost, etc., for interference limited scenarios.

In this context, that a physical antenna element 142 is configured for both signal transmission and signal reception implies that the physical antenna elements 142 is enabled for both signal transmission and signal reception, for example by having both a TX radio chain and a RX radio chain attached thereto. Further in this context, that a physical antenna element 142 is configured for only signal reception implies that the physical antenna elements 142 is enabled for only signal reception, for example by having only a RX radio chain (but no TX radio chain) attached thereto. Thus, a receiver might be connected to physical antenna elements 142 configured for only signal reception whereas a transceiver (or a transmitter and a receiver) might be connected to physical antenna elements 142 configured for both signal transmission and signal reception. Hence, the antenna arrangement 140 might comprise, or be configured to be operatively connected to, fewer transmitters, or TX radio chains, than receivers, or RX radio chains.

In the example of FIG. 4(*a*), the first portion 146*a* is defined by the two upper-most physical antenna elements 142, the second portion 146*b* is defined by the two lower-most physical antenna elements 142, and the physical antenna elements 142 configured for only signal reception are defined by the two middle-most physical antenna elements 142. Hence, when the antenna arrangement 140 is provided in a radio access network node 200 the upper-most and the lower-mots physical antenna elements 142 are used for both uplink reception and downlink transmission whereas the middle-most physical antenna elements 142 are used only for uplink reception. A first uplink/downlink portion 146*a* of physical antenna elements 142 and a second uplink/downlink portion 146*b* of physical antenna elements 142 are thus vertically separated by an uplink only portion 148 of physical antenna elements 142.

Embodiments relating to further details of the antenna arrangement 140 will now be disclosed.

In some aspects, those physical antenna elements 142 configured for both signal transmission and signal reception define a first group 146*a*, 146*b*, 146*c* of physical antenna elements 142, and those physical antenna elements 142 configured for only signal reception define a second group 148*a*, 148*b* of physical antenna elements 142.

In some aspects, the first portion 146*a* of those physical antenna elements 142 configured for both signal transmission and signal reception defines a first portion 146*a* of the first group 146*a*, 146*b*, 146*c* of physical antenna elements 142, and the second portion 146*b* of those physical antenna elements 142 configured for both signal transmission and signal reception defines a second portion 146*b* of the first group 146*a*, 146*b*, 146*c* of physical antenna elements 142.

As disclosed above with reference to FIG. 3, the antenna arrangement 140 might be divided into one or more subarrays 144. In this respect, according to an embodiment, each of the second group 148*a*, 148*b* of physical antenna elements 142, the first portion 146*a* of the first group 146*a*, 146*b*, 146*c* of physical antenna elements 142, and/or the second portion 146*b* of the first group 146*a*, 146*b*, 146*c* of physical antenna elements 142 defines its own subarray 144 of physical antenna elements 142. Thus, with reference to the example of FIG. 4(*a*) there could be three subarrays; a first subarray defined by the physical antenna elements 142 of the group 146*a*, a second subarray defined by the physical antenna elements 142 of the group 148*a*, and a third subarray defined by the physical antenna elements 142 of the group 146*b*.

The physical antenna elements 142 used for both transmission and reception might thus be grouped in subarrays, for example such that there are N physical antenna elements 142 in each subarray, and each of these subarrays corresponds to a TX radio chain and a RX radio chain. Likewise, the physical antenna elements 142 used only for reception might be grouped into subarrays, such that there are M physical antenna elements 142 in each subarray, and each of these subarrays corresponds to one RX radio chain.

In some aspects, all physical antenna elements 142 of one and the same subarray could be fed by the same signal, and hence share the same virtualized antenna port when observed at the intended receiver of the signal (such as the terminal device 160). In some embodiments each subarray 144 thus has its own virtual antenna port.

In some aspects, there are differently many physical antenna elements 142 in two or more of the groups. That is, according to an embodiment, there are differently many physical antenna elements 142 in the second group 148*a*, 148*b* of physical antenna elements 142 compared to in the first portion 146*a* of the first group 146*a*, 146*b*, 146*c* of physical antenna elements 142 and/or in the second group 148*a*, 148*b* of physical antenna elements 142 compared to in the second portion 146*b* of the first group 146*a*, 146*b*, 146*c* of physical antenna elements 142. Hence, by letting N be different from M there could be a smaller subarray size for only reception compared to the subarray size for both transmission and reception (or vice versa).

In the example of FIG. 4(*a*), the physical antenna elements 142, and thus subarrays, extend along the same vertical line. That is the subarray defined by antenna elements 142 of the second group 148*a* is located directly between the two subarrays defined by antenna elements 142 of the first group 146*a*, 146*b*. However, in some aspects, at least some of the physical antenna elements 142, and thus subarrays, are horizontally displaced with respect to each other. That is, in some embodiments, at least two of the subarrays 144 are horizontally displaced with respect to each other. FIG. 4(*b*) schematically illustrates an antenna arrangement 140 according to this embodiment, where the subarray defined by antenna elements 142 of the second group 148*a* is horizontally displaced with respect to the subarrays. As illustrated, the antenna arrangement 140 has unequally many physical antenna elements 142 for transmission and reception.

In the examples of FIG. 4(a) and FIG. 4(b), the physical antenna elements 142 are divided into three subarrays such that a subarray of physical antenna elements 142 used only for reception is sandwiched between two subarrays of physical antenna elements 142 used for both transmission and reception, and hence where the antenna arrangement 142 is composed of three vertically stacked subarrays. However, the herein disclosed embodiments are not limited to only having three vertically stacked subarrays but might have at least three vertically stacked subarrays. In particular, in some embodiments, a first subset of all physical antenna elements 142 configured for only signal reception are in the antenna arrangement 140 placed to, during operation of the antenna arrangement 140, be vertically lower than a first portion 146a of those physical antenna elements 142 configured for both signal transmission and signal reception but vertically higher than a second portion 146b of those physical antenna elements 142 configured for both signal transmission and signal reception. Further according to this embodiment, a second subset of all physical antenna elements 142 configured only for signal reception are in the antenna arrangement 140 placed to, during operation of the antenna arrangement 140, be vertically lower than the second portion 146b of those physical antenna elements 142 configured for both signal transmission and signal reception but vertically higher than a third portion of those physical antenna elements 142 configured for both signal transmission and signal reception. FIG. 4(c) schematically illustrates an antenna arrangement 140 according to this embodiment, where the antenna arrangement 142 thus is composed of five vertically stacked subarrays. Each such subarray might comprise one or more physical antenna elements 142. As illustrated, the antenna arrangement 140 has unequally many physical antenna elements 142 for transmission and reception. The skilled person would understand how the antenna arrangement 140 might be extended to more than five vertically stacked subarrays.

Figure 5:
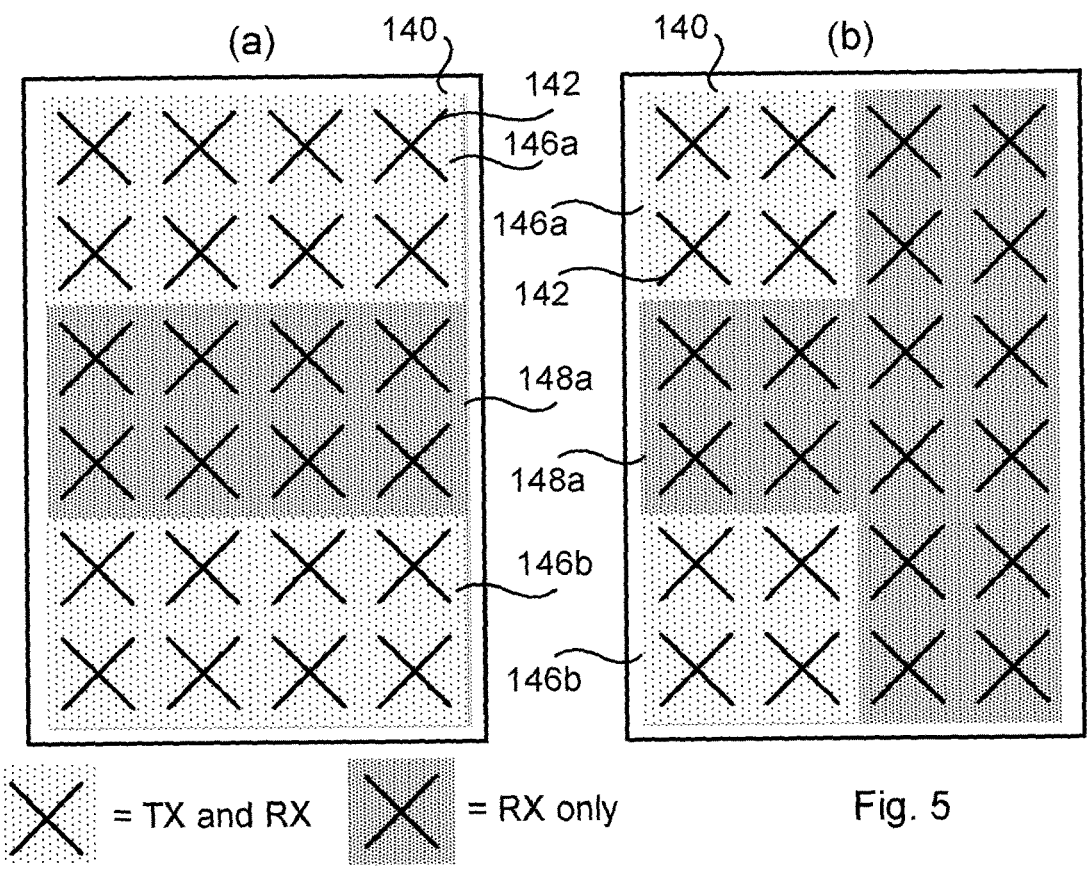

As disclosed above with reference to FIG. 2, the physical antenna elements 142 might be arranged either in a 1D antenna array or in a 2D antenna array. In some embodiments, the physical antenna elements 142 are in the antenna arrangement 140 thus arranged in at least two columns. FIG. 5 schematically illustrates an antenna arrangement 140 according to such an embodiment. In the example of FIG. 5, the antenna arrangement 140 has four columns and six rows. FIG. 5(a) shows an example where all physical antenna elements 142 configured for only signal reception are sandwiched between physical antenna elements 142 configured for both signal transmission and signal reception and hence where all physical antenna elements 142 of the second group 148a are sandwiched between the first portion 146a of those physical antenna elements 142 configured for both signal transmission and signal reception and the second portion 146b of those physical antenna elements 142 configured for both signal transmission and signal reception. As illustrated, the antenna arrangement 140 has unequally many physical antenna elements 142 for transmission and reception. FIG. 5(b) shows an example where not all physical antenna elements 142 configured for only signal reception are sandwiched between physical antenna elements 142 configured for both signal transmission and signal reception and hence where the first portion 146a of those physical antenna elements 142 configured for both signal transmission and signal reception and the second portion 146b of those physical antenna elements 142 configured for both signal transmission and signal reception are vertically separated by some but not all physical antenna elements 142 configured for only signal reception. As illustrated, the antenna arrangement 140 has unequally many physical antenna elements 142 for transmission and reception.

In some aspects, the antenna arrangement 140 has crosspolarized (or dual polarized) physical antenna elements. That is, in some embodiments, the physical antenna elements 142 are dual polarized, and each subarray 144 has its own one virtual antenna port per polarization.

Aspects, embodiments, and examples of how the antenna arrangement 140 might be configured for signal communication will now be disclosed. These aspects, embodiments, and examples apply to any of the herein disclosed antenna arrangements 140.

Aspects relating to the antenna arrangement 140 as configured for signal transmission will now be disclosed.

In some aspects, the first portion 146a of those physical antenna elements 142 configured for both signal transmission and signal reception are controlled separately from the second portion 146b of those physical antenna elements 142 configured for both signal transmission and signal reception and vice versa. Thus, a first signal can be transmitted from the first portion 146a of those physical antenna elements 142 configured for both signal transmission and signal reception whilst (at the same time) a second signal is transmitted from the second portion 146b of those physical antenna elements 142 configured for both signal transmission and signal reception. In particular, according to an embodiment, the antenna arrangement 140 is configured for individual control of signal transmission per each of the subarray 144 defined by the first portion 146a of the first group 146a, 146b, 146c of physical antenna elements 142 and the subarray 144 defined for the second portion 146b of the first group 146a, 146b, 146c of physical antenna elements 142. In this respect, to each subarray there might be a set of corresponding antenna ports defined such that these antenna ports are only transmitted from that subarray in case of downlink transmission. For instance, a given antenna port number may be set up such that it is transmitted only from one subarray but not from any of the other subarrays; for example only from the subarray defined by the first portion 146a but not from the subarray defined by the second portion 146b of physical antenna elements 142 configured for both signal transmission and signal reception, or vice versa.

In some aspects, the antenna arrangement 140 is configured for UE specific downlink beamforming. In particular, according to an embodiment, the antenna arrangement 140 is configured to, for UE specific downlink beamforming, have different beamforming, or precoder, weights applied for signal transmission at the subarray 144 defined by the first portion 146a of the first group 146a, 146b, 146c of physical antenna elements 142 compared to at the subarray 144 defined for the second portion 146b of the first group 146a, 146b, 146c of physical antenna elements 142. UE specific downlink beamforming might thus be performed by utilizing the antenna ports corresponding to the different subarrays. This implies that a set of beamforming, or precoder, weights are derived at the radio access network node 200, potentially in a dynamic fashion, and a subset of these weights are then applied to antenna ports corresponding to the one of the subarrays whilst other beamforming, or precoder, weights are applied to another subarray. This will hence enable joint beamforming from two or more subarrays by applying the beamforming, or precoder, weights simultaneously when transmitting, for instance, data signalling (such as Physical Downlink Shared Channel (PDSCH) signalling) or control signalling (such as Physical Downlink Control Channel (PDCCH) signalling).

In some aspects, a reference signal, such as a channel state information reference signal (CSI-RS), corresponding to some antenna ports is transmitted in such a way that a subset of these antenna ports is transmitted from one subarray whereas another subset of these antenna ports is transmitted from another subarray. In particular, according to an embodiment, the antenna arrangement 140 is configured to transmit different CSI-RS ports from the subarray 144 defined by the first portion 146a of the first group 146a, 146b, 146c of physical antenna elements 142 compared to from the subarray 144 defined for the second portion 146b of the first group 146a, 146b, 146c of physical antenna elements 142.

The terminal device 160 might be configured to measure on the CSI-RS transmission and report channel state information (CSI) back to the radio access network node 200, where the CSI might comprise information such as, for instance, precoding matrix index (PMI), channel quality indicator (CQI), rank indicator (RI). This CSI might then by the radio access network node 200 be used to derive the set of beamforming, or precoder, weights to be applied to the subarrays for PDSCH signalling and/or PDCC signalling.

Aspects relating to the antenna arrangement 140 as configured for signal reception will now be disclosed.

In some aspects, all physical antenna elements 142 are collectively used as one and the same subarray for signal reception, as in FIG. 3(c). That is, according to an embodiment, the antenna arrangement 140 is configured for signal reception using all the subarrays 144 as one single common subarray 144. In other aspects, the physical antenna elements 142 are divided into two or more subarrays 144, as in FIG. 3, for signal reception. That is, according to an embodiment, the antenna arrangement 140 is configured for individual control of signal reception per each of the subarrays 144.

In some aspects, the antenna arrangement 140 is configured for UE specific uplink beamforming. In particular, according to an embodiment, the antenna arrangement 140 is configured to, for UE specific uplink beamforming, have different beamforming, or precoder, weights for signal reception applied at the subarray 144 defined by the first portion 146a of the first group 146a, 146b, 146c of physical antenna elements 142 compared to at the subarray 144 defined for the second portion 146b of the first group 146a, 146b, 146c of physical antenna elements 142 and/or compared to at the subarray 144 defined for the second group 148a, 148b of physical antenna elements 142. For example, with reference again to FIG. 3(a) and FIG. 3(b), different beamforming, or precoder, weights for signal reception might be applied to two or more subarrays of physical antenna elements 142. This implies that a set of beamforming, or precoder, weights are derived at the radio access network node 200, potentially in a dynamic fashion, and a subset of these weights are then applied to antenna ports corresponding to the one of the subarrays whilst other beamforming, or precoder, weights are applied to another subarray. This will hence enable joint beamforming from two or more subarrays by applying the beamforming, or precoder, weights simultaneously when receiving, for instance, data signalling (such as Physical Uplink Shared Channel (PUSCH) signalling) or control signalling (such as Physical Uplink Control Channel (PUCCH) signalling).

FIG. 6 is a flowchart S100 illustrating embodiments of methods for using an antenna arrangement 140 as herein disclosed. The methods are performed by the radio access network node 200. The methods are advantageously provided as computer programs 920.

S102: The radio access network node 200 communicates a signal whilst applying beamforming, or precoder, weights at the physical antenna elements 142.

Embodiments relating to further details of using the antenna arrangement 140 as performed by the radio access network node 200 will now be disclosed.

In some embodiments, communicating the signal in action S102 involves transmitting the signal.

As disclosed above, in some embodiments, different beamforming, or precoder, weights are applied for signal transmission at the subarray 144 defined by the first portion 146a of the first group 146a, 146b, 146c of physical antenna elements 142 compared to at the subarray 144 defined for the second portion 146b of the first group 146a, 146b, 146c of physical antenna elements 142.

As disclosed above, in some embodiments, transmitting the signal involves transmitting different CSI-RS ports from the subarray 144 defined by the first portion 146a of the first group 146a, 146b, 146c of physical antenna elements 142 compared to from the subarray 144 defined for the second portion 146b of the first group 146a, 146b, 146c of physical antenna elements 142.

In some embodiments, communicating the signal in action S102 involves receiving the signal.

As disclosed above, in some embodiments, different beamforming, or precoder, weights for signal reception are applied at the subarray 144 defined by the first portion 146a of the first group 146a, 146b, 146c of physical antenna elements 142 compared to at the subarray 144 defined for the second portion 146b of the first group 146a, 146b, 146c of physical antenna elements 142 and/or compared to at the subarray 144 defined for the second group 148a, 148b of physical antenna elements 142.

In summary, at least some of the herein disclosed antenna arrangements 140 are based on having two groups of physical antenna elements 142, where the first group is used for both reception and transmission whereas the second group is used only for reception, where the first group of antenna elements is divided into two portions, where the first portion is placed in the upper part of the antenna arrangement 140, and where the second portion is placed in the lower part of the antenna arrangement 140, and where the second group of physical antenna elements is located between the two portions of physical antenna elements 142 of the first group of physical antenna elements 142.

Figure 7:
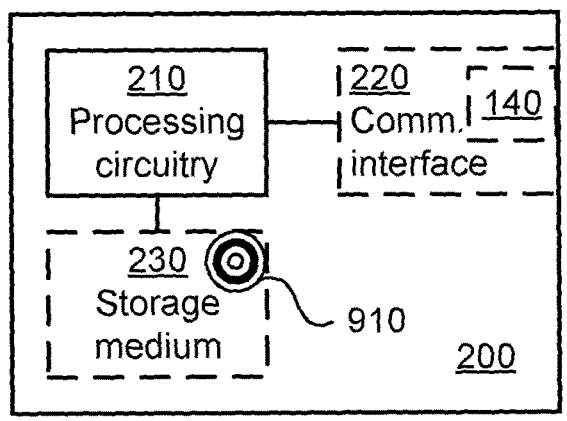
FIG. 7 is a schematic diagram showing functional units of a radio access network node according to an embodiment.

FIG. 7 schematically illustrates, in terms of a number of functional units, the components of a radio access network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio access network node 200 to perform a set of operations, or actions, as disclosed above. For example, the storage medium 230 may store the set of operations, and the processing circuitry 210 may be configured to retrieve the set of operations from the storage medium 230 to cause the radio access network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio access network node 200 may further comprise a communications interface 220 at least configured for communications with other entities, functions, nodes, and devices, of the communication network 100. As such the communications interface 220 may comprise one or more transmitters and receivers, comprising analogue and digital components. In some embodiments the communications interface 220 comprises an antenna arrangement 140 as herein disclosed.

The processing circuitry 210 controls the general operation of the radio access network node 200 e.g. by sending data and control signals to the communications interface 220 and the storage medium 230, by receiving data and reports from the communications interface 220, and by retrieving data and instructions from the storage medium 230. Other components, as well as the related functionality, of the radio access network node 200 are omitted in order not to obscure the concepts presented herein.

Figure 8:
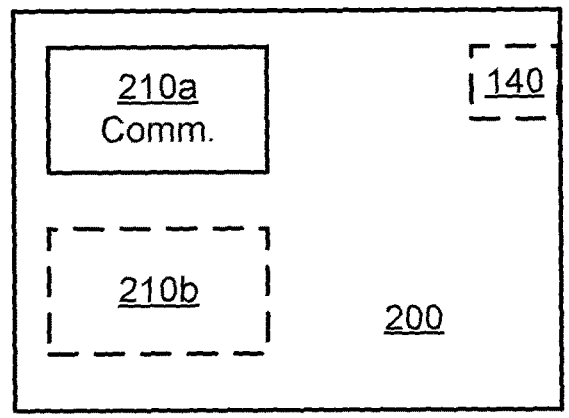
FIG. 8 is a schematic diagram showing functional modules of a radio access network node according to an embodiment.

FIG. 8 schematically illustrates, in terms of a number of functional modules, the components of a radio access network node 200 according to an embodiment. The radio access network node 200 of FIG. 8 comprises a communicate module 210a configured to perform action S102. The radio access network node 200 of FIG. 8 may further comprise a number of optional functional modules, such as represented by functional module 210b. In some embodiments the radio access network node 200 further comprises an antenna arrangement 140 as herein disclosed. In general terms, each functional module 210a-210b may in one embodiment be implemented only in hardware and in another embodiment with the help of software, i.e., the latter embodiment having computer program instructions stored on the storage medium 230 which when run on the processing circuitry makes the radio access network node 200 perform the corresponding actions mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210b may be implemented by the processing circuitry 210, possibly in cooperation with the communications interface 220 and/or the storage medium 230. The processing circuitry 210 may thus be configured to from the storage medium 230 fetch instructions as provided by a functional module 210a-210b and to execute these instructions, thereby performing any actions as disclosed herein.

The radio access network node 200 may be provided as a standalone device or as a part of at least one further device. For example, the radio access network node 200 may be provided in a node of the radio access network or in a node of the core network. Alternatively, functionality of the radio access network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time. Thus, a first portion of the instructions performed by the radio access network node 200 may be executed in a first device, and a second portion of the of the instructions performed by the radio access network node 200 may be executed in a second device; the herein disclosed embodiments are not limited to any particular number of devices on which the instructions performed by the radio access network node 200 may be executed. Hence, the methods according to the herein disclosed embodiments are suitable to be performed by a radio access network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210b of FIG. 8 and the computer program 920 of FIG. 9.

Figure 9:
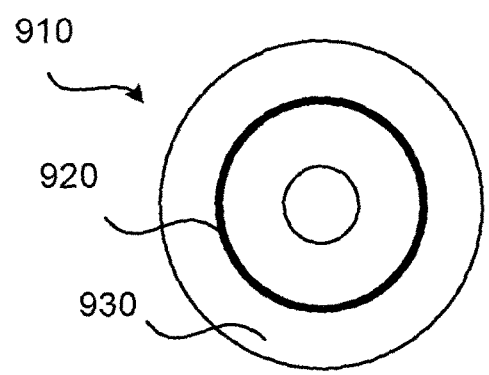
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any actions as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. An antenna arrangement having unequally many physical antenna elements for transmission and reception, the antenna arrangement comprising:
    physical antenna elements, wherein all physical antenna elements are connected to a receive chain but less than all of the physical antenna elements are connected to both a receive chain and a transmit chain, and
    wherein a first portion of those physical antenna elements connected to both a receive chain and a transmit chain and a second portion of those physical antenna elements connected to both a receive chain and a transmit chain are in the antenna arrangement placed to, during operation of the antenna arrangement, be vertically separated by physical antenna elements not connected to a transmit chain.

2. The antenna arrangement according to claim 1, wherein those physical antenna elements connected to both a receive chain and a transmit chain define a first group of physical antenna elements, and wherein those physical antenna elements not connected to a transmit chain define a second group of physical antenna elements.

3. The antenna arrangement according to claim 2, wherein the first portion of those physical antenna elements connected to both a receive chain and a transmit chain defines a first portion of the first group of physical antenna elements, and wherein the second portion of those physical antenna elements connected to both a receive chain and a transmit chain defines a second portion of the first group of physical antenna elements.

4. The antenna arrangement according to claim 3, wherein each of the second group of physical antenna elements, the first portion of the first group of physical antenna elements, and/or the second portion of the first group of physical antenna elements defines its own subarray of physical antenna elements.

5. The antenna arrangement according to claim 4, wherein each subarray has its own virtual antenna port.

6. The antenna arrangement according to claim 4, wherein the physical antenna elements are dual polarized, and wherein each subarray has its own one virtual antenna port per polarization.

7. The antenna arrangement according to claim 4, wherein at least two of the subarrays are horizontally displaced with respect to each other.

8. The antenna arrangement according to claim 4, wherein the antenna arrangement is configured for individual control of signal transmission per each of the subarray defined by the first portion of the first group of physical antenna elements and the subarray defined for the second portion of the first group of physical antenna elements.

9. The antenna arrangement according to claim 4, wherein the antenna arrangement is configured to, for user equipment (UE) specific downlink (DL) beamforming, have different beamforming, or precoder, weights applied for signal transmission at the subarray defined by the first portion of the first group of physical antenna elements compared to at the subarray defined for the second portion of the first group of physical antenna elements.

10. The antenna arrangement according to claim 4, wherein the antenna arrangement is configured to transmit different channel state information reference signal (CSI-RS) ports from the subarray defined by the first portion of the first group of physical antenna elements compared to from the subarray defined for the second portion of the first group of physical antenna elements.

11. The antenna arrangement according to claim 4, wherein the antenna arrangement is configured for signal reception using all the subarrays as one single common subarray.

12. The antenna arrangement according to claim 4, wherein the antenna arrangement is configured for individual control of signal reception per each of the subarrays.

13. The antenna arrangement according to claim 4, wherein the antenna arrangement is configured to, for user equipment (UE) specific uplink (UL) beamforming, have different beamforming, or precoder, weights for signal reception applied at the subarray defined by the first portion of the first group of physical antenna elements compared to at the subarray defined for the second portion of the first group of physical antenna elements and/or compared to at the subarray defined for the second group of physical antenna elements.

14. The antenna arrangement according to claim 2, wherein there are differently many physical antenna elements in the second group of physical antenna elements compared to in the first portion of the first group of physical antenna elements and/or in the second group of physical antenna elements compared to in the second portion of the first group of physical antenna elements.

15. The antenna arrangement according to claim 1, wherein the physical antenna elements are in the antenna arrangement arranged in at least two columns.

16. The antenna arrangement according to claim 1, wherein a first subset of all physical antenna elements not connected to a transmit chain are in the antenna arrangement placed to, during operation of the antenna arrangement, be vertically lower than a first portion of those physical antenna elements connected to both a receive chain and a transmit chain but vertically higher than a second portion of those physical antenna elements connected to both a receive chain and a transmit chain, and wherein a second subset of all physical antenna elements not connected to a transmit chain are in the antenna arrangement placed to, during operation of the antenna arrangement, be vertically lower than the second portion of those physical antenna elements connected to both a receive chain and a transmit chain but vertically higher than a third portion of those physical antenna elements connected to both a receive chain and a transmit chain.

17. A radio access network node comprising an antenna arrangement according to claim 1.

18. A method for signal communication using an antenna arrangement according to claim 1, the method comprising:
communicating a signal whilst applying beamforming, or precoder, weights at the physical antenna elements.

19. The method according to claim 18, wherein communicating the signal involves transmitting the signal.

20. The method according to claim 18, wherein communicating the signal involves receiving the signal.

* * * * *